United States Patent [19]
Hardy et al.

[11] 3,896,103
[45] July 22, 1975

[54] ACYLATED DERIVATIVES OF TRP-MET-ASP-PHE-NH$_2$

[75] Inventors: Paul Martin Hardy, Exeter; George Wallace Kenner, Liverpool; Robert Charles Sheppard, Liverpool; John Selwyn Morley, Liverpool; John Keith MacLeod, Liverpool, all of England

[73] Assignee: Imperial Chemical Industries Limited, London, England

[22] Filed: June 7, 1965

[21] Appl. No.: 462,107

[30] Foreign Application Priority Data
June 25, 1964 United Kingdom............... 26355/64
Mar. 9, 1965 United Kingdom................. 9978/65

[52] U.S. Cl............................. 260/112.5; 424/177
[51] Int. Cl. ..................... C07c 103/52; A61k 37/00
[58] Field of Search.................................. 260/112.5

[56] References Cited
UNITED STATES PATENTS
3,265,682  8/1966  Gloor et al...................... 260/112.5

OTHER PUBLICATIONS
Federal Register, 30, No. 228, 14639, Nov. 25, 1965.
Tracy et al.: Nature, 204, 935–938 (1964).

Primary Examiner—Lewis Gotts
Assistant Examiner—Reginald J. Suyat
Attorney, Agent, or Firm—Cushman, Darby & Cushman

[57] ABSTRACT

Acylated derivatives of L-tryptophanyl-L-methionyl-L-aspartyl-L-phenylalanine amide which are active in promoting the secretion of acidic gastric juice in mammals.

5 Claims, No Drawings

ACYLATED DERIVATIVES OF TRP-MET-ASP-PHE-NH₂

This invention relates to acid derivatives and more particularly it relates to acylated tetrapeptide derivatives which are useful as diagnostic and therapeutic agents.

According to the invention we provide acylated tetrapeptide derivatives of the formula:

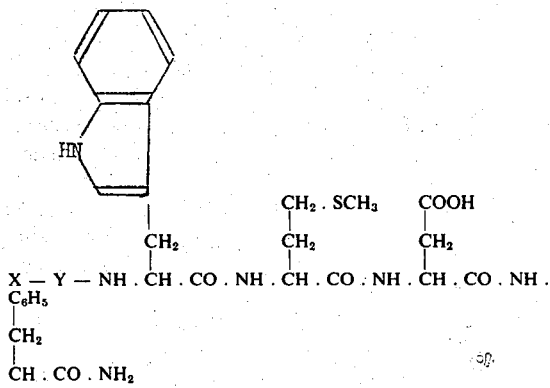

wherein X stands for an acyl radical, optionally substituted, and Y stands for a direct link between the radical (X) and the adjacent nitrogen atom, or Y stands for an aminoacyl radical of the formula:

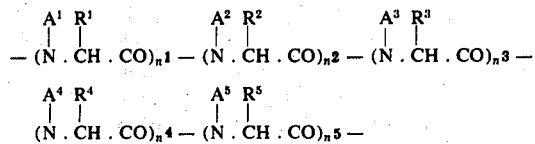

wherein $R^1$, $R^2$, $R^3$, $R^4$ and $R^5$, which may be the same or different, stand for hydrogen or for alkyl radicals, optionally substituted, and $A^1$, $A^2$, $A^3$, $A^4$ and $A^5$ stand for hydrogen, or $A^1$ and $R^1$, $A^2$ and $R^2$, $A^3$ and $R^3$, $A^4$ and $R^4$, and/or $A^5$ and $R^5$ are linked together to form, together with the adjacent nitrogen and carbon atoms, a heterocyclic ring, and wherein $n^1$, $n^2$, $n^3$, $n^4$ and $n^5$, which may be the same or different, stand for 0 or 1, and the salts thereof.

As a suitable acyl radical (X) there may be mentioned, for example, an alkylcarbonyl radical, for example an alkylcarbonyl radical of not more than 8 carbon atoms, for example the acetyl, pivaloyl or DL-2-ethylhexanoyl radical, or an arylcarbonyl radical, for example an arylcarbonyl radical of not more than 10 carbon atoms, for example the benzoyl radical, or a substituted arylcarbonyl radical, for example a phenylcarbonyl radical substituted by one or more acylamino radicals, for example the p-(trifluoroacetylamino)benzoyl radical, or an aralkylcarbonyl radical, for example of phenylalkylcarbonyl radical wherein the alkyl radical is of not more than 4 carbon atoms, for example the benzylcarbonyl radical, or an alkoxycarbonyl radical, for example an alkoxycarbonyl radical of not more than 6 carbon atoms, for example the t-butyloxycarbonyl radical, or an aryloxycarbonyl radical, for example the phenoxycarbonyl radical, or an aralkoxycarbonyl radical, for example an aralkoxycarbonyl radical of not more than 10 carbon atoms, for example the benzyloxycarbonyl radical, or an alkylsulphonyl radical, or an arylsulphonyl radical optionally substituted by an alkyl radical, for example a benzenesulphonyl radical optionally substituted by an alkyl radical of not more than 3 carbon atoms, for example the p-toluenesulphonyl radical, or an aralkylsulphonyl radical. The acyl radical (X) may alternatively be derived from an amino acid, or a derivative thereof, including an acyl derivative thereof. Thus as a suitable value for the acyl radical (X) there may be mentioned, for example, a radical derived from L-alanine or an acyl derivative thereof, for example the N-t-butyloxycarbonyl-L-alanyl or N-t-butyloxycarbonyl-N-methyl-L-alanyl radical, or a radical derived from β-alanine or an acyl derivative thereof, for example an alkylcarbonyl derivative of β-alanine containing not more than 8 carbon atoms, for example the acetyl-β-alanyl or pivaloyl-β-alanyl radical, or an alkoxycarbonyl derivative of β-alanine containing not more than 8 carbon atoms, for example the t-butyloxycarbonyl-β-alanyl radical, or an aralkoxycarbonyl derivative of β-analine, for example the benzyloxycarbonyl-β-alanyl radical, or an arylcarbonyl derivative of β-alanine, for example the benzoyl-β-alanyl radical, or a radical derived from γ-aminobutyric acid or an acyl derivative thereof, for example the acetyl-γ-aminobutyryl radical, or a radical derived from glycine or an acyl derivative thereof, for example the benzoylglycyl, t-butyloxycarbonylglycyl or benzyloxycarbonylglycyl radical, or a radical derived from L-lysine or an acyl derivative thereof, for example a derivative of L-lysine containing one or two alkoxycarbonyl or aralkoxycarbonyl radicals such that the whole acyl-L-lysine radical contains not more than 19 carbon atoms, for example the N α -t-butyloxycarbonyl-N ε -benzyloxycarbonyl-L-lysyl, N-α -benzyloxycarbonyl-N ε -t-butyloxycarbonyl-L-lysyl, N α -benzyloxycarbonyl-N ε -(4-chloro-6-dimethylaminotriazin-2-yl)-B-lysyl, N α -benzyloxycarbonyl-L-lysyl and N ε -benzyloxycarbonyl-L-lysyl radical. Alternatively, the acyl radical (X) may be derived from L-proline or an acyl derivative thereof, for example the N-benzyloxycarbonyl-L-prolyl radical, or from L-valine or an acyl derivative thereof, for example the N-benzyloxycarbonyl-L-valyl radical, or from L-phenylalanine or an acyl derivative thereof, for example the N-benzyloxycarbonyl-L-phenylalanyl radical, or from L-homocysteine or an acyl derivative thereof, for example the N-t-butyloxycarbonyl-S-benzyl-L-homocysteinyl or S-benzyl-L-homocysteinyl radical, or X may be the L-pyroglutamyl radical or carbamoyl radical (H₂N.CO—). In addition, the acyl radical (X) may be derived from L-aspartic acid, L-glutamic acid, L-histidine, L-methionine, L-threonine, L-serine, L-cysteine, L-leucine, L-isoleucine, L-arginine, L-tryptophan or L-tyrosine.

The aminoacyl radical (Y) may be derived from one or more known aminoacids, for example alanine, arginine, aspartic acid, cysteine, glutamic acid, glycine, histidine, leucine, isoleucine, lysine, methionine, ornithine, phenylalanine, proline, serine, threonine, tryptophan, tyrosine and valine. In particular, the aminoacyl radical (Y) may consist of from 1 to 5 aminoacids of the L-configuration selected from the group consisting of L-alanine, L-glutamic acid, glycine, L-isoleucine, L-lysine and L-phenylalanine. A specific value for the aminoacyl radical (Y) is, for example, the L-glutamyl-L-glutamyl-L-alanyl-L-tyrosylglycyl, the L-alanyl-L-phenylalanyl-L-isoleucylglycyl, the L-alanyl-L-tyrosylglycyl or the L-lysylglycyl radical.

As a suitable salt of an acylated tetrapeptide derivative of the invention there may be mentioned, for example, an alkali metal salt, for example a sodium or potassium salt, or an ammonium salt.

Specific values for the radical X-Y- are, for example, the N-benzoylglycyl, pyroglutamyl, N-acetyl, N-benzoyl, N α-t-butyloxycarbonyl-N ε-benzyloxycarbonyl-L-lysyl, N α-benzyloxycarbonyl-N ε-benzyloxycarbonyl-N -t-butyloxycarbonyl-L-lysyl, N-benzyloxycarbonylglycyl, N-benzyloxycarbonyl, N-t-butyloxycarbonylglycyl, glycyl, N-benzyloxycarbonyl-L-glutamyl-L-glutamyl-L-alanyl-L-tyrosylglycyl, N-t-butyloxycarbonyl, N-t-butyloxycarbonyl-β-alanyl, N-(L-2-ethylhexanoyl)glycyl, N-(D-2-ethylhexanoyl)glycyl, N-p-(trifluoroacetylamino)benzoyl, N-acetyl-β-alanyl, N-α-benzyloxycarbonyl-N ε-(4-chloro-6-dimethylaminotriazin-2-yl)-L-lysyl, N-t-butyloxycarbonyl-L-alanyl-L-phenylalanyl-L-isoleucylglycyl, N-benzyloxycarbonyl-L-prolyl, N-p-toluenesulphonyl, N-t-butyloxycarbonyl-S-benzyl-L-homocysteinyl, N-t-butyloxycarbonyl-N-methyl-L-alanyl, N α-benzyloxycarbonyl-N ε-t-butyloxycarbonyl-L-lysylglycyl, N-benzyloxycarbonyl-L-valyl, N-benzyloxycarbonyl-L-phenylalanyl, N-benzoyl-β-alanyl, N-acetyl-γ-aminobutyryl, N-carbamoyl, β-alanyl,N α -benzyloxycarbonyl-L-lysyl, Nε--benzyloxycarbonyl-L-lysyl, N α-benzyloxycarbonyl-L-lysylglycyl, S-benzyl-L-homocysteinyl, N-benzyloxycarbonyl-β-alanyl, N-pivaloyl-β-alanyl, N-t-butyloxycarbonyl-L-alanyl, and N-t-butyloxycarbonyl-L-alanyl-L-tyrosylglycyl radical.

Particularly useful acylated tetrapeptide derivatives of the invention are N-t-butyloxycarbonyl-L-alanyl-L-phenylalanyl-L-isoleucylglycyl-L-tryptophanyl-L-methionyl-L-aspartyl-L-phenylalanine amide, and N-acetyl-, N-benzoyl-, N-t-butyloxycarbonyl-L-alanyl-, N-t-butyloxycarbonyl-β-alanyl-, N-pivaloyl-β-alanyl-, N-benzyloxycarbonyl-β-alanyl-, N-acetyl-β-alanyl-, N-β-alanyl-, and N-carbamoyl-L-tryptophanyl-L-methionyl-L-aspartyl-L-phenylalanine amide, and of these the first, second, fifth, sixth and last compounds are particularly preferred.

According to a further feature of the invention we provide a process for the manufacture of the acylated tetrapeptide derivatives of the invention which comprises the acylation of the tetrapeptide derivative of the formula:

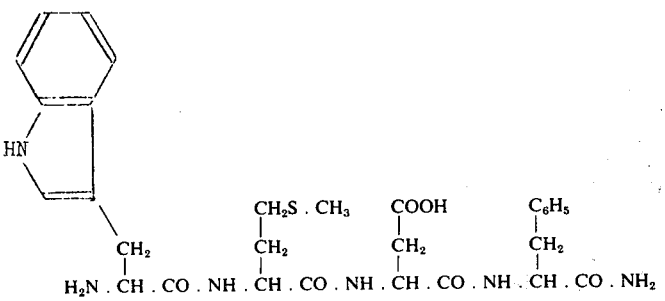

or a salt thereof, by means of a derivative of an acid of the formula X — Y — OH wherein the acid function is activated and X and Y have the meanings stated above, or a protected derivative thereof, or by means of a derivative of cyanic acid, followed if necessary by hydrogenolysis and/or hydrolysis to replace any protecting group by hydrogen.

As suitable protected derivatives of the acid of the formula X — Y — OH, wherein X and Y have the meanings stated above, there may be mentioned those protected derivatives known and used in the peptide art. Thus, for the protection of amino groups there may be mentioned, for example, the benzyloxycarbonyl, p-methoxybenzyloxycarbonyl, T-butyloxycarbonyl or trifluoroacetyl radical, and for the protection of carboxyl groups there may be mentioned, for example, the methyl, t-butyl or benzyl ester. Such protecting groups may be removed by processes known to the art, and appropriate to the protecting group in question.

As suitable derivatives of the acid of the formula X — Y — OH wherein the acid function is activated and wherein X and Y have the meanings stated above, there may be mentioned those derivatives which are formed by any of those procedures known and used in the peptide art to achieve such activation. As suitable procedures there may be mentioned, for example, formation of an acid halide, for example the acid chloride, and formation of a mixed anhydride by reaction with a derivative of a sterically-hindered organic acid, for example pivaloyl chloride, or by reaction with a derivative of a carbonic acid, for example ethyl chloroformate, or by reaction with diphenylphosphoryl chloride, and formation of an active ester, for example a nitrophenyl ester, for example the p-nitrophenyl ester, or a chlorinated phenyl ester, for example the 2,4,5-trichlorophenyl ester, and formation of an azide, and the use of one or more condensing agents, for example N,N'-dicyclohexylcarbodiimide or N,N'-carbonyl-bis-imidazole.

The particular derivative of the acid wherein the acid function is activated, which is to be used in any particular process, depends upon the acid itself. Thus, if the acid function is not attached to an asymmetric carbon atom, or if it is attached to the asymmetric carbon atom of an aminoacid, but the amino group of that aminoacid is acylated by an oxycarbonyl radical to form a radical of the formula —O.CO.NH—; then any of the above procedures may be used. However, if the acid function is attached to the asymmetric carbon atom of an aminoacid, and the amino group of that aminoacid is protected by any group other than one which forms a radical of the formula —O.CO.NH—, then the formation of the azide is the preferred procedure.

When the derivative of the acid used as reactant is an acid halide such as the acid chloride or bromide, for example benzyloxycarbonyl chloride, acetyl chloride, benzoyl chloride or p-toluenesulphonyl chloride, the reaction may conveniently be carried out in an aqueous medium at a pH of about 9–10 and in the presence of an acid-binding agent, for example sodium hydroxide or triethylamine. When the derivative of the acid used as reactant is an active ester, for example the p-nitrophenyl ester or the 2,4,5-trichlorophenyl ester, or the azide or a mixed anhydride, the process may conveniently be carried out in the presence of a diluent or solvent, for example dimethylformamide or acetone, and at a temperature of about 0°–10°C., in the presence of a base, for example triethylamine. When a free peptide derivative is used as reactant, it is sufficient to use up to one equivalent proportion of the base, but when a peptide derivative is used as reactant in the form of a salt thereof, for example as the trifluoracetate, it is preferable to use between one and two equivalent proportions of the base.

The tetrapeptide reactant used as starting material may be prepared, from a β-ester of l-aspartyl-L-phenylalanine amide by reaction thereof with a derivative of L-methionine to provide a β-ester of L-methionyl-L-aspartyl-L-phenylalanine amide, which is then reacted with a derivative of L-tryptophan and the product hydrolysed to the said tetrapeptide reactant.

As stated above, the acylated tetrapeptide derivatives of this invention are useful as diagnostic and therapeutic agents. In particular, they are active in affecting gastric and pancreatic secretion, gastric and intestinal tone, and motility and pepsin output in mammals, and they are therefore useful as diagnostic agents, and in the treatment of duodenal ulcers in man.

Thus, according to a further feature of the invention we provide pharmaceutical compositions comprising one or more of the acylated tetrapeptide derivatives of the invention together with one or more non-toxic pharmaceutically-acceptable diluents or carriers therefor.

The compositions of the invention may be obtained by using conventional methods and conventional excipients. As suitable compositions there may be mentioned, for example, coated or uncoated tablets, capsules, aqueous or non-aqueous solutions or suspensions, emulsions, aqueous or non-aqueous injectable solutions or suspensions, dispersible powders and depot formulations. The aqueous solution may also contain sodium chloride.

The invention is illustrated but not limited by the following Examples in which the parts are by weight:

EXAMPLE 1

A solution of 178 parts of L-tryptophanyl-L-methionyl-L-aspartyl-L-phenylalanine amide trifluoracetate, m.p. 185°–190°C. with effervescene, in 2,000 parts of dimethylformamide is cooled to 0°C. and 50.5 parts of triethylamine are added. The mixture is stirred and 90 parts of hippuric acid 2,4,5-trichlorophenyl ester are added at 0°C. The reaction mixture is then kept at 0°C. for 48 hours. The mixture is adjusted to pH 1 by the dropwise addition of 2N-hydrochloric acid, and then 5,000 parts of ice-water and 5,000 parts of ether are added. The mixture is stirred for 15 minutes at 0°C. and is then filtered. The solid residue is washed with water and then with ether and is dried at 40°–50°C. under reduced pressure. There is thus obtained N-benzoylglycyl-L-tryptophanyl-L-methionyl-L-aspartyl-L-phenylalanine amide, m.p. 237°–238°C. with decomposition. The product may be crystallised from ethanol when it separates in the form of white, flocculent needles.

The hippuric acid 2,4,5-trichlorophenyl ester used in the above process may be prepared as follows:

179 Parts of huppuric acid and 217 parts of 2,4,5-trichlorophenol are added to 2,000 parts of boiling acetonitrile. The resulting suspension is rapidly cooled to 30°C. with stirring and then 206 parts of N,N'-dicyclohexylcarbodiimide are added. The mixture is continuously stirred for 3 hours at 20°–30°C. and is then boiled for 5 minutes. The hot mixture is filtered and the filtrate is cooled. The colourless product which separates from the filtrate is collected by filtration and is crystallised from ethanol. There is thus obtained hippuric acid 2,4,5-trichlorophenyl ester, m.p. 148°–149°C.

EXAMPLE 2

The process described in Example 1 is repeated using 78 parts of L-pyroglutamic acid 2,4,5-trichlorophenyl ester in place of the 90 parts of hippuric acid 2,4,5-trichlorophenyl ester. There is thus obtained L-pyroglutamyl-L-tryptophanyl-L-methionyl-L-aspartyl-L-phenylalanine amide, m.p. 232°C. with decomposition.

The L-pyroglutamic acid 2,4,5-trichlorophenyl ester used in the above process may be prepared as follows:

206 Parts of N,N'-dicyclohexylcarbodiimide are added to a stirred solution of 263 parts of N-benzyloxycarbonyl-L-pyroglutamic acid and 198 parts of 2,4,5-trichlorophenol in 1,000 parts of dry tetrahydrofuran at 0°–10°C. The mixture is kept at 0°C. for 16 hours and is then filtered. The filtrate is evaporated under reduced pressure and the residue is crystallised from ethanol. There is thus obtained N-benzyloxycarbonyl-L-pyroglutamic acid 2,4,5-trichlorophenyl ester, m.p. 107°–108°C. A solution of 443 parts of this N-benzyloxycarbonylL-pyroglutamic acid 2,4,5-trichlorophenyl ester in 4,000 parts of tetrahydrofuran is stirred with 50 parts of 5% palladium-on-charcoal catalyst and hydrogen is bubbled into the mixture at 18°–22°C. and at atmospheric pressure until evolution of carbon dioxide has ceased. The reaction mixture is then filtered to remove the catalyst and the filtrate is evaporated under reduced pressure. The residue thus obtained is crystallised from methanol. There is thus obtained L-pyroglutamyl 2,4,5-trichlorophenyl ester, mp. 162°–163°C.

EXAMPLE 3

The process described in Example 1 is repeated using 46 parts of p-nitrophenyl acetate in place of the 90 parts of hippuric acid 2,4,5-trichlorophenyl ester. There is obtained $N^\alpha$-acetyl-L-tryptophanyl-L-methionyl-L-aspartyl-L-phenylalanine amide as a white solid, m.p. 245°–246°C. with effervescence.

EXAMPLE 4

The process described in Example 1 is repeated using 61 parts of p-nitrophenyl benzoate in place of the 90 parts of hippuric acid 2,4,5-trichlorophenyl ester. There is obtained $N^\alpha$-benzoyl-L-tryptophanyl-L- methionyl-L-aspartyl-L-phenylalanine amide as a white solid, m.p. 288°–230°C. with effervescence.

EXAMPLE 5

The process described in Example 1 is repeated using 140 parts of $N^\alpha$-t-butyloxycarbonyl-$N^\epsilon$-benzyloxycarbonyl-L-lysine 2,4,5-trichlorophenyl ester in place of the 90 parts of hippuric acid 2,4,5-trichlorophenyl ester. There is obtained $N^\alpha$-t-butyloxycarbonyl-$N^\epsilon$-benzyloxycarbonyl-L-lysyl-L-tryptophanyl-L-methionyl-L-aspartyl-L-phenylalanine amide as a white solid, m.p. 207°–208°C. with effervescence.

EXAMPLE 6

The process described in Example 1 is repeated using 140 parts of $N^\alpha$-benzyloxycarbonyl-$N^\epsilon$-t-butyloxycarbonyl-L-lysine 2,4,5-trichlorophenyl ester in place of the 90 parts of hippuric acid 2,4,5-trichlorophenyl ester. There is obtained $N^\alpha$-benzyloxycarbonyl-$N^\epsilon$-t-butyloxycarbonyl-L-lysyl-L-tryptophanyl-L-methionyl-L-aspartyl-L-phenylalanine amide as a white solid, m.p. 216°–217°C. with effervescence.

EXAMPLE 7

The process described in Example 1 is repeated using 97 parts of N-benzyloxycarbonylglycine 2,4,5-trichlorophenyl ester in place of the 90 parts of hippuric acid 2,4,5-trichlorophenyl ester. There is obtained N-benzyloxycarbonylglycyl-L-tryptophanyl-L-methionyl-L-aspartyl-L-phenylalanine amide as a white solid. (Found C,59.6; H,6.0; N,12.3. $C_{39}H_{45}O_9N_7S$ requires C,59.3; H,5.75; N,12.5%). The purity of the product is confirmed by hydrolysis of a small sample with 6N-hydrochloric acid. The resulting hydrolysate is examined on a Beckmann aminoacid analyser and is found to contain the following ratios of aminoacids: aspartic acid 1.00, glycine 1.02, methionine 0.87, phenylalanine 1.00.

EXAMPLE 8

1,250 Parts of water are added to a solution of 20 parts of L-tryptophanyl-L-methionyl-L-aspartyl-L-phenylalanine amide trifluoracetate in 1,600 parts of acetone. The mixture is then adjusted to pH 10.9 by portionwise addition of N-sodium hydroxide. 45.5 Parts of benzyloxycarbonyl chloride are then added and the reaction mixture so obtained is stirred at 18°–25°C. for 1½ hours while the pH of the mixture is maintained at 10.9 by means of portionwise addition of N-sodium hydroxide through an autotitrator. The bulk of the acetone is then removed by evaporation under reduced pressure and the resulting mixture is filtered. The solid residue is first washed with water and is then stirred with ethyl acetate and 2N-hydrochloric acid. The ethyl acetate layer is separated and is washed three times with water, then dried over anhydrous magnesium sulphate and evaporated. The solid residue is suspended in ether and collected by filtration. There is thus obtained N-benzyloxycarbonyl-L-tryptophanyl-L-methionyl-L-aspartyl-L-phenylalanine amide as a white solid. Thin layer chromatography, using silica gel as the adsorbent and a solvent system consisting of the upper phase obtained by mixing 25 parts of n-butanol, 6 parts of acetic acid and 25 parts of water, showed a single spot of $R_F$ 0.93 detected by Ehrlich reagent.

EXAMPLE 9

A solution of 240 parts of L-tryptophanyl-L-methionyl-L-aspartyl-L-phenylalanine amide trifluoracetate in 2,500 parts of dimethylformamide is cooled to 0°C. and 68.5 parts of triethylamine are added. The mixture is stirred and 123 parts of N-t-butyloxycarbonylglycine 2,4,5-trichlorophenyl ester are added at 0°C. The mixture is then kept at 18°–22°C. for 60 hours. 60,000 Parts of ethyl acetate and 20,000 parts of 2N-hydrochloric acid are then added and the mixture is stirred for 5 minutes. The ethyl acetate layer is separated and is washed with water. It is then dried over anhydrous magnesium sulphate and evaporated under reduced pressure. The solid residue is stirred with 5,000 parts of ethyl acetate and is then collected by filtration. There is thus obtained N-t-butyloxycarbonylglycyl-L-tryptophanyl-L-methionyl-L-aspartyl-L-phenylalanine amide as a colourless amorphous powder (Found: C,57.4; H,6,6; N,13.2. $C_{36}H_{47}O_9N_7S$ requires C,57.3; H,6.3; N,13.0%.)

EXAMPLE 10

100 Parts of N-t-butyloxycarbonylglycyl-L-tryptophanyl-L-methionyl-L-aspartyl-L-phenylalanine amide are added, with stirring, to 3,000 parts of 75% aqueous trifluoracetic acid at 15°–20°C. The resulting solution is kept at 20°–25°C. for 20 minutes. The excess of trifluoracetic acid is then removed by evaporation under reduced pressure at a temperature below 37°C. The residue is dissolved in methanol, and the methanol is then removed by evaporation under reduced pressure, again at a temperature below 37°C. The residue is again dissolved in methanol, and the methanol is removed under the same conditions. The residue is then stirred with ether and is collected by filtration. There is thus obtained glycyl-L-tryptophanyl-L-methionyl-L-aspartyl-L-phenylalanine amide as a colourless, amorphous solid.

EXAMPLE 11

102 Parts of N-benzyloxycarbonyl-($\gamma$-t-butyl)-L-glutamyl-($\gamma$-t-butyl)-L-glutamyl-L-alanyl-L-tyrosylglycine are dissolved in 10,000 parts of dimethylformamide and the solution is cooled to 0°C. 12.6 Parts of triethylamine followed by 33.5 parts of diphenylphosphoryl chloride are added at 0°C. with stirring, and the resulting mixture is further stirred for 40 minutes at 0°C. A solution of 87 parts of L-tryptophanyl-L-methionyl-L-aspartyl-L-phenylalanine amide trifluoracetate in 5,000 parts of dimethylformamide and 25.2 parts of triethylamine is then added, and the reaction mixture is stirred at 18°–22°C. for 18 hours. The solvent is removed by evaporation under reduced pressure and the residue is stirred with ethyl acetate. The mixture is filtered and the solid residue, m.p. 220°C. with decomposition, is washed with ethyl acetate and dried at 40°C. under reduced pressure. 30 Parts of this product are added to 300 parts of 95% aqueous trifluoracetic acid with stirring at 15°–20°C. The solution is kept for 1 hour at 20°–25°C. and the solvent is then removed by evaporation under reduced pressure. The residue is stirred with methanol, collected by filtration and dried at 40°C. under reduced pressure. There is thus obtained N-benzyloxycarbonyl-L-glutamyl-L-glutamyl-L-alanyl-L-tyrosylglycyl-L-tryptophanyl-L-methionyl-L-aspartyl-L-phenylalanine amide as a colourless solid. On electrophoresis at pH 6.1, a sample of the product moved towards the anode as a single spot.

EXAMPLE 12

A solution of 3.55 parts of L-tryptophanyl-L-methionyl-L-aspartyl-L-phenylalanine amide trifluoracetate in 30 parts of dimethylformamide is cooled to 0°C., and 1.01 parts of triethylamine are added. The mixture is stirred while 1.84 parts of N-t-butyloxycarbonyl-$\beta$-alanine 2,4,5-trichlorophenyl ester are added at 0°C. The reaction mixture is kept at 0°C. for 48 hours and then at 20°–23°C. for 24 hours. The mixture is added to a mixture of 100 parts of ice-water, 0.37 parts of concentrated hydrochloric acid (d. 1.18), 1.2 parts of acetic acid and 20 parts of ethyl acetate. The mixture is stirred for 15 minutes at 0°–10°C. and is then filtered. The solid residue is washed with water and then with ethyl acetate, and is dried at 40°–50°C. under reduced pressure. There is thus obtained N-t-butyloxycarbonyl-$\beta$-alanyl-L-tryptophanyl-L-methionyl-L-aspartyl-L-phenylalanine amide, m.p. 213°C. with decomposition.

The N-t-butyloxycarbonyl-$\beta$-alanine 2,4,5-trichlorophenyl ester (m.p. 94°–95°C.) used as starting material may be obtained by repeating the process described in Example 15 for the preparation of N-acetyl-$\beta$-alanine 2,4,5-trichlorophenyl ester, but using 9.5 parts of N-t-butyloxycarbonyl-$\beta$-alanine in place of the 6.55 parts of N-acetyl-$\beta$-alanine.

EXAMPLE 13

The process described in Example 12 is repeated using 1.6 parts of N-(DL-2-ethylhexanoyl)glycine p-nitrophenyl ester in place of the 1.84 parts of N-t-butyloxycarbonyl-$\beta$-alanine 2,4,5-trichlorophenyl ester. There is thus obtained a mixture of N-(L-2-ethylhexanoyl)- and N-(D-2-ethylhexanoyl)-glycyl-L-tryptophanyl-L-methionyl-L-aspartyl-L-phenylalanine amide, m.p. 228°–230°C. with decomposition.

The N-(DL-2-ethylhexanoyl)glycine p-nitrophenyl ester, m.p. 135°–136°C., used as starting material may be obtained from N-(DL-2-ethylhexanoyl)glycine, p-nitrophenol and N,N'-dicyclohexylcarbodiimide by the method described by Pless and Boissonnas in Helv. Chim. Acta., 1963, 46, 1609.

EXAMPLE 14

The process described in Example 12 is repeated using 2.06 parts of N-p-(trifluoracetylamino)benzoic acid 2,4,5-trichlorophenyl ester in place of the 1.84 parts of N-t-butyloxycarbonyl-$\beta$-alanine 2,4,5-trichlorophenyl ester. There is thus obtained N-p-(trifluoracetylamino)benzoyl-L-tryptophanyl-L-methionyl-L-aspartyl-L-phenylalanine amide, m.p. 229°–231°C. with decomposition, which may be crystallised from aqueous acetic acid.

The N-p-(trifluoracetylamino)benzoic acid 2,4,5-trichlorophenyl ester, m.p. 164°–168°C., used as starting material may be obtained from the free acid, 2,4,5-trichlorophenol, and N,N'-dicyclohexylcarbodiimide in ethyl acetate by the method described by Pless and Boissonnas in Helv. Chem. Acta., 1963, 46, 1609.

EXAMPLE 15

3.17 Parts of L-tryptophanyl-L-methionyl-L-aspartyl-L-phenylalanine amide hydrochloride are dissolved in 30 parts of dimethylformamide at 60°C. The solution is rapidly cooled to 20°C., and 1.01 parts of triethylamine are added. The mixture is stirred, cooled to 0°C., and then 1.86 parts of N-acetyl-$\beta$-alanine 2,4,5-trichlorophenyl ester are added. The reaction mixture is stirred at 0°–5°C. for 24 hours. 10 Parts of water are then added, and stirring continued at 0°–5°C. for a further 24 hours. 30 Parts of water are then added and the mixture is added to a mixture of 100 parts of ice-water, 0.74 part of concentrated hydrochloric acid (d. 1.18) and 20 parts of ethyl acetate. The mixture is stirred for 15 minutes at 0°–10°C. and is then filtered. The solid residue is washed with water and then with ethyl acetate, and is crystallised from aqueous 2-ethoxyethanol. There is thus obtained N-acetyl-$\beta$-alanyl-L-tryptphanyl-L-methionyl-L-aspartyl-L-phenylalanine amide, m.p. 245°C. with decomposition.

The N-acetyl-$\beta$-alanine 2,4,5-trichlorophenyl ester used in the above process may be obtained as follows:

A solution of 9.87 parts of 2,4,5-trichlorophenol in 100 parts of methylene chloride is added to a stirred suspension of 6.55 parts of N-acetyl-$\beta$-alanine in 250 parts of acetonitrile. The mixture is cooled to 0°C. and treated with a solution of 11 parts of N,N'-dicyclohexylcarbodiimide in 100 parts of methylene chloride. The reaction mixture is stirred at 20°–22°C. for 40 hours and then filtered. The filtrate is evaporated and the residue so obtained is crystallised from a mixture of ethyl acetate and petroleum ether (b.p. 60°–80°C.). There is thus obtained N-acetyl-$\beta$-alanine 2,4,5-trichlorophenyl ester, m.p. 88°–90°C.

EXAMPLE 16

The process described in Example 15 is repeated using 3.08 parts of $N^\alpha$-benzyloxycarbonyl-$N^\epsilon$-(4-chloro-6-dimethylaminotriazin-2-yl)-L-lysine 2,4,5-trichlorophenyl ester in place of the 1.86 parts of N-acetyl-$\beta$-alanine 2,4,5-trichlorophenyl ester. There is obtained $N^\alpha$-benzyloxycarbonyl-$N^\epsilon$-(4-chloro-6-dimethylaminotriazin-2-yl)-L-lysyl-L-tryptophanyl-L-methionyl-L-aspartyl-L-phenylalanine amide, m.p. 233°C. with decomposition.

The $N^\alpha$-benzyloxycarbonyl-$N^\epsilon$-(4-chloro-6-dimethylaminotriazin-2-yl)-L-lysine 2,4,5-trichlorophenyl ester used in the above process may be prepared as follows:

1.03 Parts of N,N'-dicyclohexylcarbodiimide are added to a stirred solution of 0.437 part of $N^\alpha$-benzyloxycarbonyl-$N^\epsilon$-(4-chloro-6-dimethylaminotriazin-2-yl)-L-lysine and 0.217 part of 2,4,5-trichlorophenol in 5 parts of dry tetrahydrofuran at 0°C. The mixture is stirred at 0°–2°C. for 18 hours and then filtered. The filtrate is evaporated and the residue is crystallised from ethyl acetate. There is thus obtained $N^\alpha$-benzyloxycarbonyl-$N^\epsilon$-(4-chloro-6-dimethylaminotriazin-2-yl)-L-lysine 2,4,5-trichlorophenyl ester, m.p. 167°–168°C.

The $N^\alpha$-benzyloxycarbonyl-$N^\epsilon$-(4-chloro-6-dimethylaminotriazin-2-yl)-L-lysine used in the above process may be prepared as follows:

A solution of 1.93 parts of 2-dimethylamino-4,6-dichlorotriazine in 15 parts of acetone is added dropwise over 5 minutes to 10 parts of vigorously stirred ice-water. The resulting finely divided suspension is stirred and warmed to 30°C., then a solution of 2.8 parts of $N^\alpha$-benzyloxycarbonyl-L-lysine in 10 parts of N-sodium hydroxide is added dropwise over 10 minutes at 30°–35°C. The mixture is then further stirred at 30°–35°C. for 15 minutes. During the addition and the subsequent stirring the pH is kept at 10–10.5 by dropwise addition of N-sodium hydroxide (10 parts). Most of the acetone is then removed from the mixture by evaporation under reduced pressure, and the remaining aqueous solution is acidified with acetic acid. The mixture is filtered and the solid residue is crystallised from ethanol. There is thus obtained $N^\alpha$-benzyloxycarbonyl-$N^\epsilon$-(4-chloro-6-dimethylaminotriazin-2-yl)-L-lysine, m.p. 161°–162°C.

EXAMPLE 17

A solution of 3.55 parts of L-tryptophanyl-L-methionyl-L-aspartyl-L-phenylalanine amide trifluoracetate in 50 parts of dimethylformamide is cooled to 0°C. and treated with 1.01 parts of triethylamine. 3.43 Parts of N-t-butyloxycarbonyl-L-alanyl-L-phenylalanyl-L-isoleucylglycine 2,4,5-trichlorophenyl ester are added, and the mixture is stirred at 0°–5°C. for 2 days. 50 Parts of water are then added and stirring is continued at 20°–25°C. for a further day. The mixture is warmed to 50°–60°C. and filtered. The solid residue is stirred for 15 minutes with 100 parts of boiling ethyl acetate and the hot mixture is filtered. The solid residue is dissolved in 150 parts of hot acetic acid, and 100 parts of water are added to the solution. The crystals which separate from the mixture are collected by filtration, washed with 50% aqueous acetic acid and then with ethyl acetate, and dried in vacuo at 40°–50°C. There is thus obtained N-t-butyloxycarbonyl-L-alanyl-L-phenylalanyl-L-isoleucylglycyl-L-tryptophanyl-L-methionyl-L-aspartyl-L-phenylalanine amide, m.p. 248°–250° C. with decomposition. Thin layer chromatography, using silica gel as the adsorbent and a solvent system consisting of the upper phase obtained by mixing 40 parts of n-butanol, 10 parts of acetic acid and 50 parts of water, showed a single spot of $R_F$ 0.79. Similarly, chromatography using a solvent system consisting of 75 parts of isobutanol and 25 parts of 3% ammonium hydroxide showed a single spot of $R_F$ 0.46.

The N-t-butyloxycarbonyl-L-alanyl-L-phenylalanyl-L-isoleucylglycine 2,4,5-trichlorophenyl ester (decomposed above 260°C.) used as starting material may be obtained from the acid, 2,4,5-trichlorophenol, and N,N'-dicyclohexylcarbodiimide by the method described by Pless and Boissonnas in Helv. Chim. Acta., 1963, 46, 1609.

EXAMPLE 18

A solution of 1.78 parts of L-tryptophanyl-L-methionyl-L-aspartyl-L-phenylalanine amide trifluoracetate in 15 parts of dimethylformamide is cooled to 0°C., and 0.505 part of triethylamine is added. 0.93 Part of N-benzyloxycarbonyl-L-proline p-nitrophenyl ester is added, and the mixture is stirred at 0°C. for 48 hours and then at 20°–22°C. for 24 hours. 70 Parts of ice-water are then added and the mixture is extracted with 20 parts of ethyl acetate which is back-washed with water. The aqueous phase and the back-washings are acidified to pH 2 with N-hydrochloric acid, and the mixture is filtered. The solid residue is crystallised from ethanol. There is thus obtained N-benzyloxycarbonyl-L-prolyl-L-tryptophanyl-L-methionyl-L-aspartyl-L-phenylalanine amide, m.p. 238°–240°C. with decomposition.

EXAMPLE 19

63.3 Parts of L-tryptophanyl-L-methionyl-L-aspartyl-L-phenylalanine amide hydrochloride are added to 1,000 parts of water containing 220 parts of N-sodium hydroxide. The mixture is stirred at 20°–22°C. until a clear solution is obtained, and then a solution of 10.5 parts of p-toluenesulphonyl chloride in 200 parts of acetone is added over 1 hour while the pH of the reaction mixture is kept at 10–11 by periodical addition of N-sodium hydroxide. The mixture is stirred for a further 2 hours at 20°–22°C. while the pH is maintained at 10–11 by addition of N-sodium hydroxide when necessary. The mixture is extracted with ether and the aqueous phase is acidified to pH 2 with N-hydrochloric acid. The mixture is filtered and the solid residue is washed with water and then with ethyl acetate. There is thus obtained N-p-toluenesulphonyl-L-tryptophanyl-L-methionyl-L-aspartyl-L-phenylalanine amide, m.p. 233°–234°C. with decomposition.

EXAMPLE 20

A solution of 3.55 parts of L-tryptophanyl-L-methionyl-L-aspartyl-L-phenylalanine amide trifluoracetate in 30 parts of dimethylformamide is cooled to 0°C. 1.01 Parts of triethylamine, followed by 2.52 parts of N-t-butyloxycarbonyl-S-benzyl-L-homocysteine 2,4,5-trichlorophenyl ester are added, and the mixture is stirred at 0°–5°C. for 4 days. The mixture is added to a mixture of 120 parts of ice-water, 0.37 part of concentrated hydrochloric acid and 1.2 parts of acetic acid. The mixture is stirred for 30 minutes at 0°–10°C. and is then filtered. The solid residue is washed with water and then with ether, and then crystallised from ethanol. There is thus obtained N-t-butyloxycarbonyl-S-benzyl-L-homocysteinyl-L-tryptophanyl-L-methionyl-L-aspartyl-L-phenylalanine amide, m.p. 215°–216°C. with decomposition.

The N-t-butyloxycarbonyl-S-benzyl-L-homocysteine 2,4,5-trichlorophenyl ester used in the above process may be prepared as follows:

2.06 Parts of N,N'-dicyclohexylcarbodiimide are added to a stirred solution of 3.25 parts of N-t-butyloxycarbonyl-S-benzyl-L-homocysteine and 1.98 parts of 2,4,5-trichlorophenol in 20 parts of ethyl acetate at 0°–10°C. The mixture is stirred at 0°C. for 18 hours and then filtered. The filtrate is evaporated under reduced pressure and the residue is crystallised from cyclohexane. There is thus obtained N-t-butyloxycarbonyl-S-benzyl-L-homocysteine 2,4,5-trichlorophenyl ester, m.p. 111°–112°C.

EXAMPLE 21

The process described in Example 20 is repeated using 1.92 parts of N-t-butyloxycarbonyl-N-methyl-L-alanine 2,4,5-trichlorophenyl ester in place of the 2.52 parts of N-t-butyloxycarbonyl-S-benzyl-L-homocysteine 2,4,5-trichlorophenyl ester. There is thus obtained N-t-butyloxycarbonyl-N-methyl-L-alanyl-L-tryptophanyl-L-methionyl-L-aspartyl-L-phenylalanine amide, m.p. 180°–185°C. with decomposition.

The N-t-butyloxycarbonyl-N-methyl-L-alanine 2,4,5-trichlorophenyl ester may be obtained as an oil by the method described by Pless and Boissonas in Helv. Chim Acta., 1963, 46, 1609.

EXAMPLE 22

The process described in Example 20 is repeated using 3.09 parts of $N^\alpha$-benzyloxycarbonyl-$N^\epsilon$-t-butyloxycarbonyl-L-lysylglycine 2,4,5-trichlorophenyl ester in place of the 2.52 parts of N-t-butyloxycarbonyl-S-benzyl-L-homocysteine 2,4,5-trichlorophenyl ester. There is thus obtained $N^\alpha$-benzyloxycarbonyl-$N^\epsilon$-t-butyloxycarbonyl-L-lysylglycyl-L-tryptophanyl-L-methionyl-L-aspartyl-L-phenylalanine amide, m.p. 200°–201°C. with decomposition.

The $N^\alpha$-benzyloxycarbonyl-$N^\epsilon$-t-butyloxycarbonyl-L-lysylglycine 2,4,5-trichlorophenyl ester, m.p. 126°–127°C., may be obtained by the method of Pless and Boissonnas, Helv. Chim. Acta., 1963, 46, 1609, from the corresponding acid, m.p. 131°–132°C., itself obtained from the corresponding methyl ester, m.p. 91°–92C., which is obtained from $N^\alpha$-benzyloxycarbonyl-$N^\epsilon$-t-butyloxycarbonyl-L-lysine and glycine methyl ester by the conventional mixed anhydride procedure.

EXAMPLE 23

A solution of 1.78 parts of L-tryptophanyl-L-methionyl-L-aspartyl-L-phenylalanine amide trifluoracetate in 15 parts of dimethylformamide is cooled to 0°C., and 0.505 part of triethylamine and 1.08 parts of N-benzyloxycarbonyl-L-valine 2,4,5-trichlorophenyl ester are added. The mixture is stirred at 0°–5°C. for 2 days and then at 20°–22°C. for 1 day. The mixture is added to a solution of 0.37 part of concentrated hydrochloric acid (d. 1.18) in 50 parts of ice-water. The resulting mixture is stirred for 30 minutes at 20°–25°C. and is then filtered. The solid residue is washed with water and then with ether, and is then crystallised from aqueous 2-ethoxyethanol. There is thus obtained N-benzyloxycarbonyl-L-valyl-L-tryptophanyl-L-methionyl-L-aspartyl-L-phenylalanine amide, m.p. 246°–247°C. with decomposition.

EXAMPLE 24

The process described in Example 23 is repeated using 1.2 parts of N-benzyloxycarbonyl-L-phenylalanine 2,4,5-trichlorophenyl ester in place of the 1.08 parts of N-benzyloxycarbonyl-L-valine 2,4,5-trichlorophenyl ester. There is thus obtained N-benzyloxycarbonyl-L-phenylalanyl-L-tryptophanyl-L-methionyl-L-aspartyl-L-phenylalanine amide, m.p. 241°–243°C. with decomposition, which may be crystallised from aqueous acetic acid.

EXAMPLE 25

A solution of 3.41 parts of L-tryptophanyl-L-methionyl-L-aspartyl-L-phenylalanine amide trifluoroacetate in 20 parts of dimethylformamide containing 1.01 parts of triethylamine is mixed at 0°C. with a solution of 1.86 parts of N-benzoyl-β-alanine 2,4,5-trichlorophenyl ester in 40 parts of dimethylformamide. After 60 hours at 0°C. the pH of the solution is adjusted to 2–3 with citric acid. The solution is then diluted with 500 parts of ice-water, and the solid so produced is collected by filtration, washed successively with water and diethyl ether, and then crystallised from aqueous 2-methoxyethanol. There is thus obtained N-benzyl-β-alanyl-L-tryptophanyl-L-methionyl-L-aspartyl-L-phenylalanine amide, m.p. 200°–201°C.

The N-benzoyl-β-alanine 2,4,5-trichlorophenyl ester used as starting material in the above process may be obtained as follows:

A solution of 9.87 parts of 2,4,5-trichlorophenol in 100 parts of methylene dichloride is added to a stirred suspension of 9.65 parts of N-benzoyl-β-alanine in 250 parts of acetonitrile at 0°C., and a solution of 11 parts of N,N'-dicyclohexylcarbodiimide in 100 parts of methylene dichloride is then added. The reaction mixture is stirred for 40 hours at ambient temperature, and then filtered. The solid is washed with methylene dichloride, and the filtrate and washings are evaporated. The residue is triturated with petroleum ether (b.p. 60°–80°C.), and the solid is filtered off and crystallised from a mixture of ethyl acetate and petroleum ether (b.p. 60°–80°C.). There is thus obtained N-benzoyl-β-alanine 2,4,5-trichlorophenyl esster, m.p. 120°–122°C.

EXAMPLE 26

The process described in Example 25 is repeated using 1.63 parts of N-acetyl-γ-aminobutyric acid 2,4,5-trichlorophenyl ester in place of 1.86 parts of N-benzoyl-β-alanine 2,4,5-trichlorophenyl ester. The product is crystallised from a mixture of methanol and ethyl acetate. There is thus obtained N-acetyl-γ-amnobutyryl-L-tryptophanyl-L-methionyl-L-aspartyl-L-phenylalanine amide, m.p. 217°–218°C.

The N-acetyl-γ-aminobutyric acid 2,4,5-trichlorophenyl ester used in the above process may be obtained as follows:

1.98 Parts of 2,4,5-trichlorophenol are added to a stirred suspension of 1.45 parts of N-acetyl-γ-aminobutyric acid in 15 parts of acetonitrile at 0°C. A pre-cooled solution of 2.3 parts of N,N'-dicyclohexyl-carbodiimide in 5 parts of acetonitrile is then added, and the mixture is stirred at ambient temperature for 18 hours. The mixture is filtered and the solid residue is dissolved in 30 parts of hot methanol. 60 parts of hot ethyl acetate are then added and the solution is cooled. The precipitated solid is filtered off, and the filtrate is evaporated. The residue is crystallised from ethyl acetate, and there is thus obtained N-acetyl-γ-aminobutyric acid 2,4,5-trichlorophenyl ester, m.p. 122°–124°C.

EXAMPLE 27

2.8 Parts of N-methylmorpholine are added to a suspension of 1.77 parts of L-tryptophanyl-L-methionyl-L-aspartyl-L-phenylalanine amide trifluoracetate in 10 parts of water and 10 parts of dimethylformamide, and the mixture is stirred for 30 minutes to effect dissolution. The pH of the solution is adjusted to 8 with glacial acetic acid, and a solution of 1.08 parts of potassium cyanate in 5 parts of water is then added. The mixture is kept at ambient temperature for 24 hours, and is then diluted with 100 parts of water. The pH of the mixture is adjusted to 2–2.5 using 2N-hydrochloric acid, and the precipitated solid is filtered off and crystallised from aqueous dimethylformamide. There is thus obtained N-carbamoyl-L-tryptophanyl-L-methionyl-L-aspartyl-L-phenylalanine amide, m.p. 205°–206°C.

EXAMPLE 28

A suspension of 1.54 parts of N-t-butyloxycarbonyl-β-alanyl-L-tryptophanyl-L-methionyl-L-aspartyl-L-phenylalanine amide in 10 parts of acetic acid is treated with 2.5 parts of 3.8N-hydrogen chloride in ethyl acetate. The mixture is stirred at 20°–22°C. until a clear solution is obtained (ca. 15 minutes), and then for a further 30 minutes at 20°–22°C. 60 Parts of dry ether are then added, and the mixture is filtered. The solid residue is washed three times with ether and dried in vacuo at 30°–40°C. There is thus obtained β-alanyl-L-tryptophanyl-L-methionyl-L-aspartyl-L-phenylalanine amide hydrochloride, which decomposes at 208°C.

EXAMPLE 29

15 Parts of N$^\alpha$-benzyloxycarbonyl-N$^\epsilon$-t-butyloxycarbonyl-L-lysyl-L-tryptophanyl-L-methionyl-L-aspartyl-L-phenylalanine amide are added to 100 parts of 80% aqueous trifluoroacetic acid. The mixture is stirred at 20°–22°C. for 45 minutes, and then 600 parts of dry ether are added. The mixture is filtered, the solid residue is washed 4 times with dry ether, and is then dried at 20°–25°C. under reduced pressure. There is thus obtained N$^\alpha$-benzyloxycarbonyl-L-lysyl-L-tryptophanyl-L-methionyl-L-aspartyl-L-phenylalanine amide trifluoroacetate, m.p. 198°–200°C. with decomposition.

EXAMPLE 30

The process described in Example 29 is repeated using 15 parts of N$^\alpha$-t-butyloxycarbonyl-N$^\epsilon$-benzyloxycarbonyl-L-lysyl-I-tryptophanyl-L-methionyl-L-aspartyl-L-phenylalanine amide in place of the 15 parts of the isomeric N$^\alpha$-benzyloxycarbonyl-N$^\epsilon$-t-butyloxycarbonyl derivative. There is thus obtained N$^\epsilon$-benzyloxycarbonyl-L-lysyl-L-tryptophanyl-L-methionyl-L-aspartyl-L-phenylalanine amide trifluoracetate, m.p. 192°–193°C. with decomposition.

EXAMPLE 31

The process described in Example 29 is repeated using 15 parts of N$^\alpha$-benzyloxycarbonyl-N$^\epsilon$-t-butyloxycarbonyl-L-lysylglycyl-L-tryptophanyl-L-methionyl-L-aspartyl-L-phenylalanine amide in place of the 15 parts of N$^\alpha$-benzyloxycarbonyl-N$^\epsilon$-t-butyloxycarbonyl-L-lysyl-L-tryptophanyl-L-methionyl-L-aspartyl-L-phenylalanine amide. There is thus obtained N$^\alpha$-benzyloxycarbonyl-L-lysylglycyl-L-tryptophanyl-L-methionyl-L-aspartyl-L-phenylalanine amide trifluoroacetate as a white solid. Thin layer chromatography of this product, using silica gel as the adsorbent and a solvent system consisting of the upper phase obtained by mixing 25 parts of n-butanol, 6 parts of acetic acid and 25 parts of water, showed a single spot of R$_F$ 0.67.

EXAMPLE 32

1 Part of N-t-butyloxycarbonyl-S-benzyl-L-homocysteinyl-L-tryptophanyl-L-methionyl-L-aspartyl-L-phenylalanine amide is added to 10 parts of 80% aqueous trifluoroacetic acid. The mixture is stirred at 20°–22°C. for 1 hour, and 60 parts of dry ether are then added. The mixture is filtered and the solid residue is washed 4 times with dry ether and then dried at 20°–25°C. under reduced pressure. There is thus obtained S-benzyl-L-homocysteinyl-L-tryptophanyl-L-methionyl-L-aspartyl-L-phenylalanine amide trifluoroacetate. Thin layer chromatography, using silica gel as the adsorbent and a solvent system consisting of the upper phase obtained by mixing 25 parts of n-butanol, 6 parts of acetic acid and 25 parts of water, showed a single spot.

EXAMPLE 33

A solution of 3.17 parts of L-tryptophanyl-L-methionyl-L-aspartyl-L-phenylalanine amide hydrochloride in 40 parts of dimethylformamide is cooled to 0°C., and 1.01 parts of triethylamine are added. The mixture is stirred while 2.21 parts of N-benzyloxycarbonyl-β-alanine 2,4,5-trichlorophenyl ester are added at 0°C. The reaction mixture is stirred at 0°–5°C. for 18 hours, then 10 parts of water are added and stirring is continued at 20°–22°C. for a further 24 hours. The mixture is warmed at 70°–75°C. until all the solid material has dissolved (this is usually complete within 2 minutes), and then the resulting hot solution is added to a stirred mixture of 500 parts of ice-water, 10 parts of N-hydrochloric acid and 200 parts of cyclohexane. The mixture is filtered and the solid residue is washed with water and with ether and then crystallised from 2-ethoxyethanol. There is thus obtained N-benzyloxycarbonyl-β-alanyl-L-tryptophanyl-L-methionyl-L-aspartyl-L-phenylalanine amide, m.p. 230°–232°C. with decomposition.

The N-benzyloxycarbonyl-β-alanine 2,4,5-trichlorophenyl ester used in the above process may be obtained by the same process as described in Example 20 for the preparation of N-t-butyloxycarbonyl-S-benzyl-L-homocysteine, 2,4,5-trichlorophenyl ester but using 2.23 parts of β-alanine in place of the 3.25 parts of N-t-butyloxycarbonyl-S-benzyl-L-homocysteine. There is obtained N-benzyloxycarbonyl-β-alanine 2,4,5-trichlorophenyl ester, m.p. 94°–95°C.

EXAMPLE 34

A solution of 3.17 parts of L-tryptophanyl-L-methionyl-L-aspartyl-L-phenylalanine amide hydrochloride in 40 parts of dimethylformamide is cooled to 0°C., and 1.01 parts of triethylamine followed by 2.02 parts of N-t-butyloxycarbonyl-L-alanine 2,4,5-trichlorophenyl ester are added at 0°C. The reaction mixture is stirred at 0°C. for 48 hours, and then it is added to a mixture of 300 parts of ice-water, 0.37 part of concentrated hydrochloric acid (d 1.18), 1.2 parts of acetic acid and 100 parts of cyclohexane. The mixture is stirred for 15 minutes at 0°–10°C. and then it is filtered. The solid residue is washed with water, then with ether and then it is dried at 40°–50°C. under reduced pressure. There is thus obtained N-t-butyloxycarbonyl-L-alanyl-L-tryptophanyl-L-methionyl-L-phenylalanine amide, m.p. 223°–225°C. with decomposition.

EXAMPLE 35

1.01 Parts of triethylamine are added to a solution of 3.55 parts of L-tryptophanyl-L-methionyl-L-aspartyl-L-phenylalanine amide trifluoroacetate and 2.64 parts of N-pivaloyl-β-alanine 2,4,5-trichlorophenyl ester in 30 parts of dimethylformamide. The resulting solution is kept at 20°–22°C. for 2 days and then it is added to a mixture of 500 parts of ice-water, 0.74 part of concentrated hydrochloric acid (d 18) and 300 parts of cyclohexane. The mixture is filtered and the solid residue is washed with water, then with ether and then it is crystallised from aqueous ethanol. There is thus obtained N-pivaloyl-β-alanyl-L-tryptophanyl-L-methionyl-L-aspartyl-L-phenylalanine amide, m.p. 218°–220°C.

The N-pivaloyl-β-alanine 2,4,5-trichlorophenyl ester used in the above process may be obtained as follows:

1.03 Parts of N,N'-dicyclohexylcarbodiimide are added to a stirred solution of 0.866 part of N-pivaloyl-β-alanine and 1.04 parts of 2,4,5-trichlorophenol in 20 parts of acetone at 0°–10°C. The mixture is stirred at 0°–2°C. for 18 hours, and is then filtered. The filtrate is evaporated under reduced pressure, and the residue is crystallised from di-isopropyl ether. There is thus obtained N-pivaloyl-β-alanine, 2,4,5-trichlorophenyl ester, m.p. 70°–72°C.

The N-pivaloyl-β-alanine used in the above process may be obtained as follows:

1.23 Parts of pivaloyl chloride are added over 15 minutes to a stirred solution of 3.51 parts of β-alanine benzyl ester p-toluenesulphonate and 2.02 parts of triethylamine in 20 parts of chloroform at 0°–4°C. The mixture is stirred at 20°–22°C. for 2 hours, and then 10 parts of water are added. The organic phase is separated and washed successively with 10 parts of N-sodium hydrogen carbonate, 10 parts of water, 10 parts of 0.5N-hydrochloric acid and 10 parts of water. It is then dried over anhydrous magnesium sulphate and evaporated. The residual oil is dissolved in 15 parts of 90% aqueous acetic acid, and the resulting solution is hydrogenated at room temperature and pressure over 0.5 part of 5% palladium-on-charcoal catalyst for 4 hours. The mixture is then filtered, and the filtrate is evaporated. The resulting residue is dried by azeotropic distillation with benzene, and then crystallised from ethyl acetate. There is thus obtained N-pivaloyl-β-alanine, m.p. 131.5°–132.5°C.

EXAMPLE 36

A mixture of 7.11 parts of L-tryptophanyl-L-methionyl-L-aspartyl-L-phenylalanine amide trifluoracetate, 2.8 parts of t-butyloxycarbonyl azide, 3.03 parts of triethylamine and 80 parts of pyridine is stirred at 23°–24°C. for 4 days. The mixture is then evaporated at 0.1 mm. pressure, and the resulting residue is stirred with 100 parts of ice-water. 10% Aqueous citric acid is added until the pH of the mixture is 3, and the mixture is then filtered. The solid residue is washed well with water and crystallised from aqueous 2-ethoxyethanol. There is thus obtained N-t-butyloxycarbonyl-L-tryptophanyl-L-methionyl-L-aspartyl-L-phenylalanine amide, m.p. 209°–210°C. with effervescence.

EXAMPLE 37

A solution of 0.409 part of N-t-butyloxycarbonyl-L-alanyl-L-tyrosylglycine and 0.1 part of triethylamine in 10 parts of tetrahydrofuran is cooled to −20°C., and a solution of 0.123 part of pivaloyl chloride in 10 parts of tetrahydrofuran is added during 10 minutes at −10° to −20°C. The solution is stirred for 20 minutes and then a solution of 0.71 part of L-tryptophanyl-L-methionyl-L-aspartyl-L-phenylalanine amide trifluoracetate and 0.2 part of triethylamine in 8 parts of dimethylformamide is added. The reaction mixture is kept at 0°C. for 20 hours, and is then added to a mixture of 50 parts of water, 1 part of N-hydrochloric acid and 0.12 part of acetic acid. The solid is filtered off, washed with water, and then with boiling ethanol. The residual solid is then filtered off. There is thus obtained N-t-butyloxycarbonyl-L-alanyl-L1tyrosylglycyl-L-trypotphanyl-L-methionyl-L-aspartyl-L-phenylalanine amide, m.p. 234°C. with decomposition.

The N-t-butyloxycarbonyl-L-alanyl-L-tyrosylglycine used as starting material may be obtained as follows:

5.5 Parts of N-t-butyloxycarbonyl-L-alanyl-L-tyrosylglycine methyl ester are suspended in 32 parts of methanol, and 26 parts of N-sodium hydroxide solution are added. The resulting solution is stirred at 0°C. for 1 hour, and then evaporated. The residue is dissolved in 40 parts of water, and the solution is acidified with 6.3 parts of citric acid. The solid which separates is collected by filtration. There is thus obtained N-t-butyloxycarbonyl-L-alanly-L-tyrosylglycine, m.p. 195°–197°C. after sintering at 169°–181°C.

EXAMPLE 38

1 Part of N-t-butyloxycarbonyl-β-alanyl-L-tryptophanyl-L-methionyl-L-aspartyl-L-phenylalanine amide and 1,000 parts of distilled water containing 2.6 parts of N-ammonium hydroxide are shaken at 20°–22°C. for 3 hours. The resulting solution is treated with 8.8 parts of sodium chloride, and then it is sterilised by filtration through a sterile bacteria-proof filter. There is thus obtained an isotonic, sterile injectable aqueous solution of N-t-butyloxycarbonyl-β-alanyl-L-tryptophanyl-L-methionyl-L-aspartyl-L-phenylalanine amide containing one part of the peptide derivative in 1000 parts of solution. The ultraviolet absorption spectrum of the solution showed λ min. 246.5 mμ (ε2080), λ infection 272–275mμ (ε5040) and λmaxima 280mμ (ε5340) and 289 mμ (ε4590).

What we claim is:

1. N-t-Butyloxycarbonyl-L-alanyl-L-phenylalanyl-L-isoleucylglycyl-L-tryptophanyl-L-methionyl-L-aspartyl-L-phenylalanine amide and the acid addition salts thereof.

2. N-Acetyl-L-tryptophanyl-L-methionyl-L-aspartyl-L-phenylalanine amide and the acid addition salts thereof.

3. N-t-Butyloxycarbonyl-β-alanyl-L-tryptophanyl-L-methionyl-L-aspartyl-L-phenylalanine amide and the acid addition salts thereof.

4. N-Pivaloyl-β-alanyl-L-tryptophanyl-L-methionyl-L-aspartyl-L-phenylalanine amide and the acid addition salts thereof.

5. N-Carbamoyl-L-tryptophanyl-L-methionyl-L-aspartyl-L-phenylalanine amide and acid addition salts thereof.

\* \* \* \* \*